(12) United States Patent
Liu et al.

(10) Patent No.: US 10,335,868 B2
(45) Date of Patent: Jul. 2, 2019

(54) PNEUMATIC MILLING WHEEL CAP SECTION BURR DEVICE

(71) Applicant: CITIC Dicastal CO., LTD, Qinhuangdao (CN)

(72) Inventors: Huiying Liu, Qinhuangdao (CN); Guorui Wu, Qinhuangdao (CN); Shan Ma, Qinhuangdao (CN); Lei Jiang, Qinhuangdao (CN)

(73) Assignee: CITIC DICASTAL CO., LTD (CN)

( * ) Notice: Subject to any disclaimer, the term of this patent is extended or adjusted under 35 U.S.C. 154(b) by 39 days.

(21) Appl. No.: 15/842,036

(22) Filed: Dec. 14, 2017

(65) Prior Publication Data
US 2019/0030625 A1   Jan. 31, 2019

(30) Foreign Application Priority Data

Jul. 31, 2017  (CN) .......................... 2017 1 0635514

(51) Int. Cl.
*B23C 3/12* (2006.01)
*B23Q 7/05* (2006.01)
*B23B 5/16* (2006.01)

(52) U.S. Cl.
CPC ................ *B23C 3/12* (2013.01); *B23B 5/163* (2013.01); *B23Q 7/05* (2013.01);
(Continued)

(58) Field of Classification Search
CPC ............ Y10T 29/5124; Y10T 29/5196; Y10T 409/30532; Y10T 409/305824; Y10T 409/306048; Y10T 409/30896; B23Q 1/5406; B23Q 7/05; B23Q 7/055; B23C 3/12; B23C 2215/085; B23C 2220/20
(Continued)

(56) References Cited

U.S. PATENT DOCUMENTS 5,688,084 A * 11/1997 Fritz ........................ B23Q 1/03
                                                              310/13
2007/0273108 A1* 11/2007 Kitatsuru .............. B23B 31/185
                                                              279/106
(Continued)

FOREIGN PATENT DOCUMENTS

DE         4339754 C1 *  3/1995  ............. B23B 41/00
DE         19949645 A1 *  4/2001  ............... B23B 5/02
(Continued)

*Primary Examiner* — Sunil K Singh
*Assistant Examiner* — Michael Vitale
(74) *Attorney, Agent, or Firm* — Calfee, Halter & Griswold LLP

(57) ABSTRACT

Disclosed is a pneumatic milling wheel cap section burr device, which includes a lifting cylinder, guide posts, guide sleeves, a lifting table, adjusting guide rails, an adjusting slide block, an adjusting cylinder, a connecting rod, a turnover platform, feeding guide rails, a feeding platform, a feeding cylinder, an air compressor and a pneumatic milling cutter. A servo motor drives a rotating table to turn over 90 degrees, and the clamped wheel can turn over 90 degrees, so that the wheel is upright; the lifting cylinder drives the lifting table to move up and down to adjust the height of the pneumatic milling cutter; and the adjusting cylinder adjusts the angle of the turnover platform to adjust the contact angle of the pneumatic milling cutter and the cap section edge.

1 Claim, 4 Drawing Sheets

(52) U.S. Cl.
CPC .... *B23C 2215/085* (2013.01); *B23C 2220/16* (2013.01); *B23C 2220/20* (2013.01); *B23C 2260/04* (2013.01); *B23C 2270/027* (2013.01); *Y10T 29/5124* (2015.01); *Y10T 409/30532* (2015.01); *Y10T 409/30896* (2015.01); *Y10T 409/304144* (2015.01); *Y10T 409/304256* (2015.01); *Y10T 409/305824* (2015.01)

(58) Field of Classification Search
USPC .......... 29/33 P, 563; 409/159, 168, 172, 224
See application file for complete search history.

(56) References Cited

U.S. PATENT DOCUMENTS

| | | | | |
|---|---|---|---|---|
| 2009/0094815 | A1* | 4/2009 | Okanda | B23Q 1/0081 29/560.1 |
| 2012/0326402 | A1* | 12/2012 | Grob | B23Q 1/0009 279/134 |
| 2014/0271016 | A1* | 9/2014 | Chou | B23B 31/185 409/224 |
| 2014/0318019 | A1* | 10/2014 | Tsuchida | B23Q 11/0825 49/413 |

FOREIGN PATENT DOCUMENTS

| | | | | |
|---|---|---|---|---|
| DE | 202010016314 U1 | * | 3/2011 | ............. B23B 3/065 |
| EP | 1380382 A1 | * | 1/2004 | ........... B23Q 1/4857 |

* cited by examiner

PNEUMATIC MILLING WHEEL CAP SECTION BURR DEVICE

CROSS-REFERENCE TO RELATED APPLICATIONS

This application claims priority to Chinese Patent Application No. 2017106355148, filed on Jul. 31, 2017, which is hereby incorporated by reference in its entirety.

TECHNICAL FIELD

The present application relates to the technical field of removal of cap section edge burrs after machining of wheels, specifically to a device for automatically removing cap section edge burrs by adopting a pneumatic milling cutter.

BACKGROUND ART

The corner corrosion problem of wheel cap sections has been badly in need of improvement. For a cast wheel having the front side not machined, burrs at the cap section are located at the joint area of machining and casting and distributed circumferentially, and it is difficult to ensure consistency and no residue when the burrs are removed. Particularly for a polished product, if the burr removing effect is not ideal after machining, it is difficult to polish corners in the polishing procedure, the coated corner film is not thick enough, and corrosion is finally caused.

SUMMARY OF THE INVENTION

In order to eliminate corrosion, the mode of removing burrs from the cap section edge of the polished product is changed from a burr cutter to a milling process, and the milling process enables the cap section edge to be smoother and is more beneficial to corrosion resistance. The present application is aimed at providing a pneumatic milling wheel cap section burr device for realizing automatic continuous production, improving the productivity and improving the burr removing effect.

In order to fulfill the above aim, the present application adopts the following technical solution: A pneumatic milling wheel cap section burr device includes a frame, bearing seats, bearings, a rotating table, a servo motor, a coupling, clamping guide rails, a left sliding table, a right sliding table, a gear rack, a clamping cylinder, rotating drive motors, clamping wheels, a wheel feeding roller bed, a turnover roller bed, a wheel discharge roller bed, a lifting cylinder, guide posts, guide sleeves, a lifting table, adjusting guide rails, an adjusting slide block, an adjusting cylinder, a connecting rod, a turnover platform, feeding guide rails, a feeding platform, a feeding cylinder, an air compressor and a pneumatic milling cutter.

The servo motor is mounted on the frame, the output end of the motor is connected with the right end of the rotating table via the coupling, the left end of the rotating table is mounted on the frame via the bearing and the bearing seat, and the servo motor can control rotation of the rotating table. The turnover roller bed is mounted on the rotating table, the four clamping guide rails are symmetrically mounted on the rotating table, the left sliding table and the right sliding table are symmetrically mounted on the clamping guide rails, the left sliding table is connected with the right sliding table via the gear rack, the four rotating drive motors are symmetrically mounted on the left sliding table and the right sliding table, and the clamping wheels are mounted at the output ends of the rotating drive motors. The output end of the clamping cylinder is connected with the left sliding table, and when the left sliding table is driven to move, the right sliding table moves synchronously with the left sliding table under the engagement effect of the gear rack, so that a wheel is clamped and loosened by the clamping wheels. After the wheel is positioned and clamped, the rotating drive motors control rotations of the clamping wheels to realize rotation of the wheel. The servo motor drives the rotating table to turn over 90 degrees, and the clamped wheel can turn over 90 degrees, so that the wheel is upright. This is a wheel clamping and turnover system, which completes positioning, clamping, turnover and rotation of the wheel.

The lifting cylinder is fixed on the frame, the output end of the lifting cylinder is connected with the lifting table, and the lifting table can be driven to move up and down under the guiding effect of the four guide posts. The two adjusting guide rails and the adjusting cylinder are mounted on the lifting table, the adjusting slide block is mounted on the adjusting guide rails, the output end of the adjusting cylinder is connected with the adjusting slide block, the turnover platform is articulated with the lifting table, one end of the connecting rod is articulated with the turnover platform, the other end of the connecting rod is articulated with the adjusting slide block, and the angle of the turnover platform can be adjusted when the adjusting cylinder drives the adjusting slide block to move horizontally. The two feeding guide rails and the feeding cylinder are mounted on the turnover platform, the feeding platform is mounted on the feeding guide rails, the output end of the feeding cylinder is connected with the feeding platform, the air compressor is fixed on the feeding platform, the pneumatic milling cutter is mounted at the output end of the air compressor, the rotating speed of the pneumatic milling cutter is controlled by controlling the air outlet quantity of the air compressor, and the feeding cylinder drives the feeding platform to move to complete feeding of the pneumatic milling cutter. The lifting cylinder drives the lifting table to move up and down to adjust the height of the pneumatic milling cutter, thereby meeting the requirement for removing burrs from wheels having different cap section diameters; and the adjusting cylinder adjusts the angle of the turnover platform to adjust the contact angle between the pneumatic milling cutter and the cap section edge, thereby meeting the requirement for removing burrs from various cap section chamfers. This is a pneumatic milling cutter feeding system, which completes height adjustment, angle adjustment and milling feeding of the cutter.

The working process of the device is as follows: firstly, the wheel feeding roller bed rotates to feed a wheel into the turnover roller bed, then the clamping cylinder is started to position and clamp the wheel, next, the servo motor is started to drive the rotating table to turn over 90 degrees, the clamped wheel is thus turned over 90 degrees, the front side of the wheel is opposite to the pneumatic milling cutter feeding system, the rotating drive motors are started, and the wheel rotates. The position of the pneumatic milling cutter is adjusted in advance according to the diameter and chamfer angle of the cap section, the air compressor is opened, and the pneumatic milling cutter rotates. When the wheel is turned over in place and begins rotating, the feeding cylinder is started to feed the pneumatic milling cutter, and removal of cap section burrs is completed by the cooperation of the rotating wheel and the rotating milling cutter. Finally, after burr removal, the rotating table is reset to a horizontal state, the wheel is loosened, the turnover roller bed rotates, and the wheel is conveyed to the wheel discharge roller bed. This is a cyclic process of the device, and the operation is repeated, so that the cycle is short and the efficiency is high.

Figure 1:
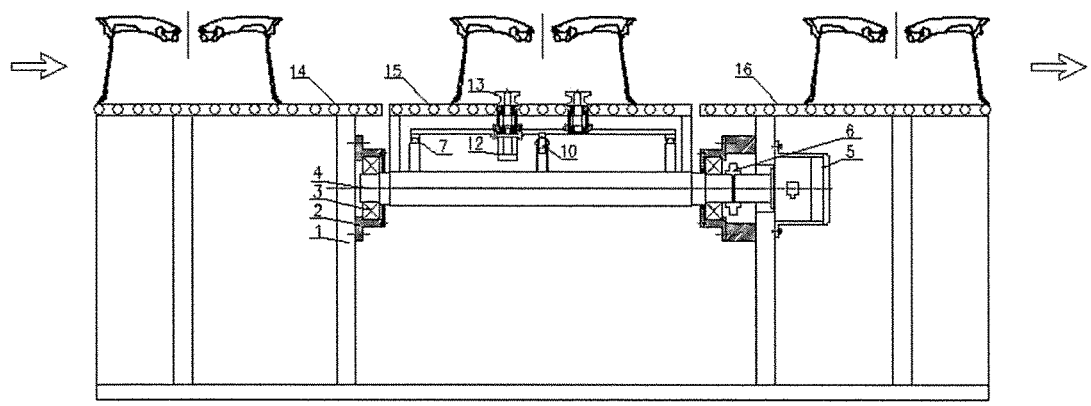
FIG. 1 is a front view of a pneumatic milling wheel cap section burr device of the present application.
Figure 2:
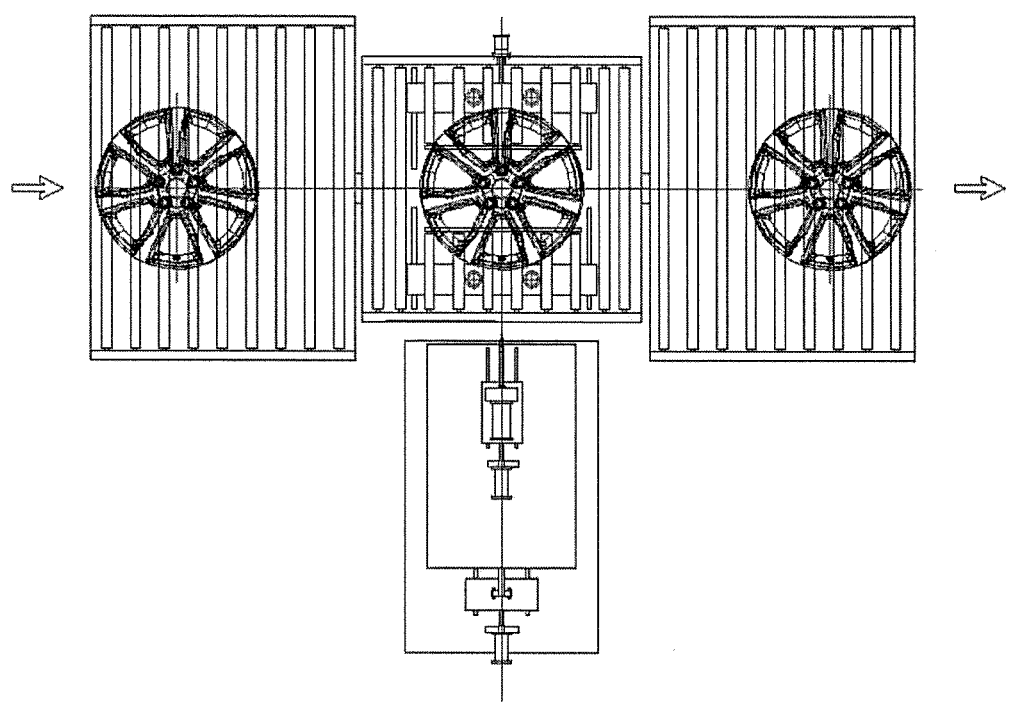
FIG. 2 is a top view of the pneumatic milling wheel cap section burr device of the present application.
Figure 3:
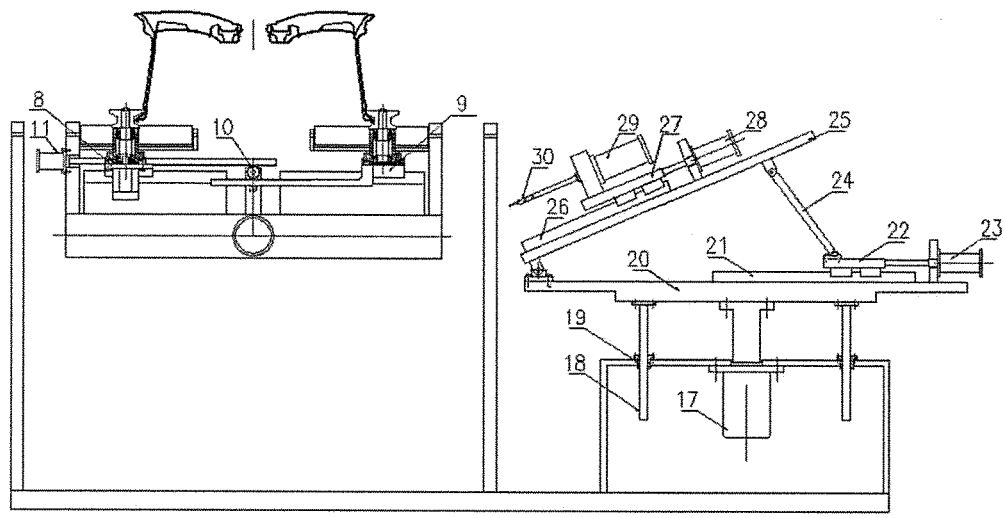
FIG. 3 is a left view of the pneumatic milling wheel cap section burr device of the present application.
Figure 4:
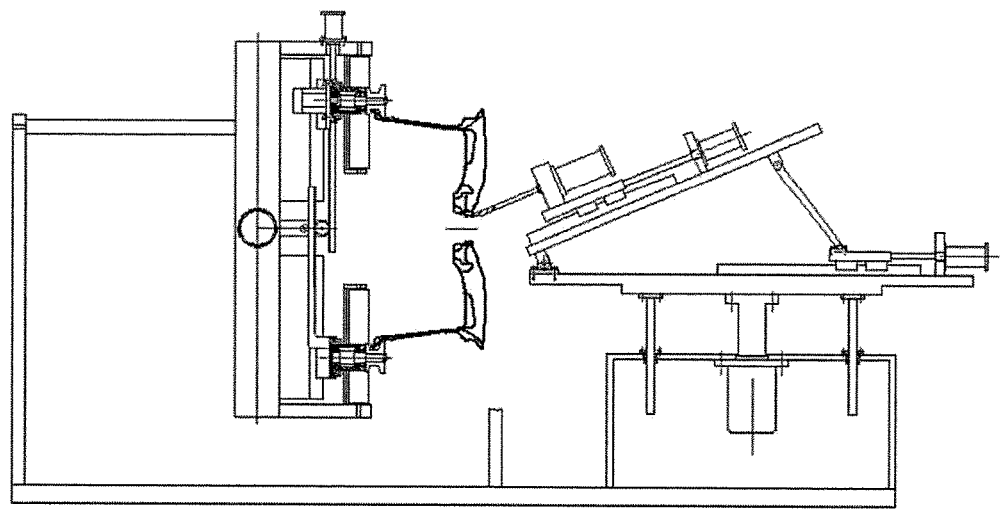
FIG. 4 is a schematic diagram when the pneumatic milling wheel cap section burr device of the present application works.

In which: 1—frame, 2—bearing seat, 3—bearing, 4—rotating table, 5—servo motor, 6—coupling, 7—clamping guide rail, 8—left sliding table, 9—right sliding table, 10—gear rack, 11—clamping cylinder, 12—rotating drive motor, 13—clamping wheel, 14—wheel feeding roller bed, 15—turnover roller bed, 16—wheel discharge roller bed, 17—lifting cylinder, 18—guide post, 19—guide sleeve, 20—lifting table, 21—adjusting guide rail, 22—adjusting slide block, 23—adjusting cylinder, 24—connecting rod, 25—turnover platform, 26—feeding guide rail, 27—feeding platform, 28—feeding cylinder, 29—air compressor, 30—pneumatic milling cutter.

DETAILED DESCRIPTION OF THE INVENTION

Details and working conditions of a specific device provided by the present application will be given below in combination with the accompanying drawings.

A pneumatic milling wheel cap section burr device includes a frame 1, bearing seats 2, bearings 3, a rotating table 4, a servo motor 5, a coupling 6, clamping guide rails 7, a left sliding table 8, a right sliding table 9, a gear rack 10, a clamping cylinder 11, rotating drive motors 12, clamping wheels 13, a wheel feeding roller bed 14, a turnover roller bed 15, a wheel discharge roller bed 16, a lifting cylinder 17, guide posts 18, guide sleeves 19, a lifting table 20, adjusting guide rails 21, an adjusting slide block 22, an adjusting cylinder 23, a connecting rod 24, a turnover platform 25, feeding guide rails 26, a feeding platform 27, a feeding cylinder 28, an air compressor 29 and a pneumatic milling cutter 30.

The servo motor 5 is mounted on the frame 1, the output end of the motor is connected with the right end of the rotating table 4 via the coupling 6, the left end of the rotating table 4 is mounted on the frame 1 via the bearing 3 and the bearing seat 2, and the servo motor 5 can control rotation of the rotating table 4. The turnover roller bed 15 is mounted on the rotating table 4, the four clamping guide rails 7 are symmetrically mounted on the rotating table 4, the left sliding table 8 and the right sliding table 9 are symmetrically mounted on the clamping guide rails 7, the left sliding table 8 is connected with the right sliding table 9 via the gear rack 10, the four rotating drive motors 12 are symmetrically mounted on the left sliding table 8 and the right sliding table 9, and the clamping wheels 13 are mounted at the output ends of the rotating drive motors 12. The output end of the clamping cylinder 11 is connected with the left sliding table 8, and when the left sliding table 8 is driven to move, the right sliding table 9 moves synchronously with the left sliding table 8 under the engagement effect of the gear rack 10, so that a wheel is clamped and loosened by the clamping wheels 13. After the wheel is positioned and clamped, the rotating drive motors 12 control rotations of the clamping wheels 13 to realize rotation of the wheel. The servo motor 5 drives the rotating table 4 to turn over 90 degrees, and the clamped wheel can turn over 90 degrees, so that the wheel is upright. This is a wheel clamping and turnover system, which completes positioning, clamping, turnover and rotation of the wheel.

The lifting cylinder 17 is fixed on the frame 1, the output end of the lifting cylinder 17 is connected with the lifting table 20, and the lifting table 20 can be driven to move up and down under the guiding effect of the four guide posts 18. The two adjusting guide rails 21 and the adjusting cylinder 23 are mounted on the lifting table 20, the adjusting slide block 22 is mounted on the adjusting guide rails 21, the output end of the adjusting cylinder 23 is connected with the adjusting slide block 22, the turnover platform 25 is articulated with the lifting table 20, one end of the connecting rod 24 is articulated with the turnover platform 25, the other end of the connecting rod 24 is articulated with the adjusting slide block 22, and the angle of the turnover platform 25 can be adjusted when the adjusting cylinder 23 drives the adjusting slide block 22 to move horizontally. The two feeding guide rails 26 and the feeding cylinder 28 are mounted on the turnover platform 25, the feeding platform 27 is mounted on the feeding guide rails 26, the output end of the feeding cylinder 28 is connected with the feeding platform 27, the air compressor 29 is fixed on the feeding platform 27, the pneumatic milling cutter 30 is mounted at the output end of the air compressor 29, the rotating speed of the pneumatic milling cutter 30 is controlled by controlling the air outlet quantity of the air compressor 29, and the feeding cylinder 28 drives the feeding platform 27 to move to complete feeding of the pneumatic milling cutter 30. The lifting cylinder 17 drives the lifting table 20 to move up and down to adjust the height of the pneumatic milling cutter 30, thereby meeting the requirement for removing burrs from wheels having different cap section diameters; and the adjusting cylinder 23 adjusts the angle of the turnover platform 25 to adjust the contact angle between the pneumatic milling cutter 30 and the cap section edge, thereby meeting the requirement for removing burrs from various cap section chamfers. This is a pneumatic milling cutter feeding system, which completes height adjustment, angle adjustment and milling feeding of the cutter.

The working process of the device is as follows: firstly, the wheel feeding roller bed 14 rotates to feed a wheel into the turnover roller bed 15, then the clamping cylinder 11 is started to position and clamp the wheel, next, the servo motor 5 is started to drive the rotating table 4 to turn over 90 degrees, the clamped wheel is thus turned over 90 degrees, the front side of the wheel is opposite to the pneumatic milling cutter feeding system, the rotating drive motors 12 are started, and the wheel rotates. The position of the pneumatic milling cutter 30 is adjusted in advance according to the diameter and chamfer angle of the cap section, the air compressor 29 is opened, and the pneumatic milling cutter 30 rotates. When the wheel is turned over in place and begins rotating, the feeding cylinder 28 is started to feed the pneumatic milling cutter 30, and removal of cap section burrs is completed by the cooperation of the rotating wheel and the rotating milling cutter. Finally, after burr removal, the rotating table 4 is reset to a horizontal state, the wheel is loosened, the turnover roller bed 15 rotates, and the wheel is conveyed to the wheel discharge roller bed 16. This is a cyclic process of the device, and the operation is repeated, so that the cycle is short and the efficiency is high.

The foregoing descriptions of specific exemplary embodiments of the present application have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the claims appended hereto and their equivalents.

What is claimed is:

1. A pneumatic milling wheel cap section burr device, comprising: a frame, bearing seats, bearings, a rotating table, a servo motor, a coupling, clamping guide rails, a left sliding table, a right sliding table, a gear rack, a clamping cylinder, rotating drive motors, clamping wheels, a wheel feeding roller bed, a turnover roller bed, a wheel discharge roller bed, a lifting cylinder, guide posts, guide sleeves, a lifting table, adjusting guide rails, an adjusting slide block, an adjusting cylinder, a connecting rod, a turnover platform, feeding guide rails, a feeding platform, a feeding cylinder, an air compressor and a pneumatic milling cutter, wherein the servo motor drives the rotating table to turn over 90 degrees, and a clamped wheel is configured to turn over 90 degrees, so that the wheel is upright; the lifting cylinder drives the lifting table to move up and down to adjust a height of the pneumatic milling cutter, thereby meeting a requirement for removing burrs from wheels having different cap section diameters; and the adjusting cylinder adjusts the angle of the turnover platform to adjust a contact angle between the pneumatic milling cutter and a cap section edge, thereby meeting the requirement for removing burrs from various cap section chamfers.

* * * * *